United States Patent

Leuchtmann et al.

Patent Number: 5,582,453
Date of Patent: Dec. 10, 1996

[54] MOTOR VEHICLE REAR SEAT WITH A DIVIDED BACK REST

[75] Inventors: Andrew Leuchtmann, Bad Kreuznach; Hans-Peter Gimbel, Trebur, both of Germany

[73] Assignee: General Motors Corporation, Detroit, Mich.

[21] Appl. No.: 369,225

[22] Filed: Jan. 6, 1995

[30] Foreign Application Priority Data

Feb. 24, 1994 [DE] Germany ............... 44 05 698.2

[51] Int. Cl.⁶ .................................................. B60N 2/20
[52] U.S. Cl. ........................... 296/65.1; 297/378.13
[58] Field of Search ................. 297/378.12, 378.13; 296/65.1, 68.1, 69

[56] References Cited

U.S. PATENT DOCUMENTS

| | | | |
|---|---|---|---|
| 3,408,103 | 10/1968 | Hewitt | 296/66 |
| 3,516,704 | 6/1970 | Riester | 296/65 |
| 3,788,685 | 1/1974 | Leichtl | 297/378.13 X |
| 4,475,763 | 10/1984 | Hamatani et al. | 296/65.1 |
| 4,708,385 | 11/1987 | Kondo | 297/378.13 X |
| 4,721,338 | 1/1988 | Kondo | 297/378.13 |
| 4,869,541 | 9/1989 | Wainwright | 296/65.1 |
| 5,273,336 | 12/1993 | Schubring et al. | 296/65.1 |

FOREIGN PATENT DOCUMENTS

| | | |
|---|---|---|
| 0125978 | 11/1984 | European Pat. Off. . |
| 0336819 | 10/1989 | European Pat. Off. .......... B60N 1/10 |
| 0474368 | 3/1992 | European Pat. Off. . |
| 0516593 | 12/1992 | European Pat. Off. .......... B60N 2/36 |
| 2532595 | 3/1984 | France ........................ B60N 1/06 |
| 2553778 | 3/1992 | France ........................ B60N 2/20 |
| 2667280 | 4/1992 | France . |
| 3211363 | 10/1983 | Germany . |
| 3110130C2 | 8/1988 | Germany . |
| 916746 | 1/1963 | United Kingdom . |
| 2247616 | 3/1992 | United Kingdom . |

OTHER PUBLICATIONS

Abstracts from Derwent Publication "Vehicle Trim & Hardware" 95–293738/39 and 95–293739/39, Schmidt GmbH.

*Primary Examiner*—Peter R. Crown
*Attorney, Agent, or Firm*—Ernest E. Helms

[57] ABSTRACT

In a motor vehicle rear seat with a divided back rest, the individual back rest parts are hinged for the purpose of pivoting about at least one horizontal pivot axis running transversely to the travel direction via an inner hinge arranged on the inside in the region of the plane of division of the back rest and an outer hinge arranged in the region of the side wall of the motor vehicle on the vehicle body. Each hinge has a fastening part on the back rest side and on the vehicle body side. Each back rest part in the approximately vertical position of use is capable of being locked to the side wall by means of a locking device. To increase the safety of the passenger, at least on the inner hinge another locking device is provided which can be locked and unlocked jointly with the locking device engaging the side wall.

6 Claims, 8 Drawing Sheets

MOTOR VEHICLE REAR SEAT WITH A DIVIDED BACK REST

FIELD OF THE INVENTION

The invention relates to a rear seat for a motor vehicle with a divided back rest. The individual back rest parts are joined to the vehicle body in order to pivot about at least one horizontal pivot axis running transversely to the direction of travel by an inner hinge arranged in the region of the dividing plane of the back rest and an outer hinge arranged in the region of the side wall of the motor vehicle. Each hinge has a fastening part mounted on the back rest side and one on the vehicle body side. Each back rest part is capable of being locked in the approximately vertical position of use to the side wall by means of a locking device.

BACKGROUND OF THE INVENTION

Such vehicle rear seats are used especially in passenger and multipurpose vehicles having a cargo space behind the back rest which can be enlarged by folding the back rest down. In modern vehicles, in order to increase the comfort, the back rest is divided in the center or off center, and the back rest parts are individually capable of being unlocked and folded back.

Generally in such back rests, however, the danger exists that in the case of an extreme load, especially in the case of a rear or front collision, the free ends of the back rest parts will be unable to withstand the pressure on the cargo space in the region of the division plane. The back rest parts may undergo deformation (especially in the central region of the back rest), resulting in the release of the locks on the side wall.

To reduce this danger, it is known that an additional locking device for the releasable locking of the two back rest parts to one another can be arranged in the plane of division, said locking device being on the side wall and the additional locking device being connected by an activation rod for simultaneous activation.

This additional locking device, however, offers effective protection only if both back rest parts are locked together and to the side wall. As soon as one back rest part is in the folded position, the additional locking device no longer provides protection.

SUMMARY OF THE INVENTION

The primary advantage achieved by the invention is the fact that due to the joint locking on the side wall and on the inner hinge, the stability of each back rest part is increased regardless of the position of the other back rest part. By the additional locking on the inner hinge in the case of a load on the back rest part due to an accident, a moment of resistance about the pivoting axis of the back rest part arises which is directed against the forces acting on the back rest part. In this way, the risk of injury for the passengers is reduced.

For joint locking and unlocking according to this invention, it is provided that between the two locking devices of a back rest part, an active connection exists whereby the locking or unlocking of a locking device, e.g., of the locking device engaging the side wall, triggers the locking or unlocking of the other locking device, e.g., on the inner hinge. The active connection may be of mechanical design, e.g., a rod, or electrical. In the latter case, one or even both locking devices can be equipped with devices for electrical activation, such as electrical control elements, so that for locking and unlocking, only one activation signal from a locking device has to be transmitted to the other.

The two locking devices can be activated jointly in an especially simple manner if the active connection is designed as a cable pull which is attached on the one hand to a spring-loaded locking bolt of the lock mechanism of the locking device engaging the side wall, and on the other is attached in a releasable manner to a movably mounted locking lever of the locking device on the inner hinge. For this purpose, on the lock bolt and the locking lever, conventional holders for a releasable connection are provided with the corresponding cable ends. Because of its flexibility, the cable pull, which can also be designed as a Bowden cable, is especially well suited for being laid and affixed in the hollow spaces of the back rest part or the vehicle body.

When the back rest pan is pivoted back into the approximately vertical position of use, the locking mechanism automatically locks and thus anchors the back rest part to the side wall. At this time, the movement of the lock bolt, which is spring mounted on the locking mechanism, out of an engaged release position into the locking position is transmitted by the cable pull to the locking lever of the locking device on the inner hinge so that the inner hinge is also locked.

The inner hinge has, as usual, two fastening parts, one on the back rest side and one on the vehicle body side. According to the invention, a lug is provided on the fastening part on the vehicle body side which, in the approximately vertical position of use of the back rest part, passes through an opening in the fastening part on the back rest side. Since the locking lever is advantageously designed as a two-arm pivoting lever with a turning knuckle arranged between the two arms, one of the two pivoting arms may engage the lug upon activation and in this way hold the fastening part on the back rest side firmly to the fastening part on the vehicle body side. In this way, the back rest part can no longer rotated about the pivot axis.

The two locking devices are unlocked in an especially simple manner by activating a release button arranged on the back rest part. This causes the lock bolt to be moved against the force of the spring until it ultimately passes into the release position. As in the case of the locking process, here also the movement of the lock bolt is transmitted by the cable pull to the locking lever on the inner hinge and thus causes it to open.

According to another advantageous version of the invention, the locking lever may be designed as a movably mounted spring-loaded pin which, in the locked position, passes through a boring correspondingly arranged on the fastening part or on the vehicle body. As a result, the fastening part on the back rest side is held firmly to the fastening part on the vehicle body side. The pin in this case is spring tensioned in the locking direction.

The joint locking and unlocking of the two locking devices in this version is similar to that in the version in which the locking lever is designed as a pivoting lever. As opposed to this, however, the pull cable connecting the two locking devices is not connected directly to the lock bolt of the locking mechanism directly but rather via a rocker which reverses the direction of motion of the cable. The rocker is arranged rotatably on the locking mechanism or on the back rest part in such a way that one side of the rocker is in direct contact with the locking bolt or with an extension on the locking bolt, and the other side of the rocker is connected to the cable in a releasable manner. In this case, the springs tensioning the pin, whose spring tension is transmitted via the cable connected to the pin to the rocker, assures that the locking bolt and the rocker remain in constant contact during locking and unlocking. The springs may also be arranged on the cable and/or on the rocker. For unlocking at the same time the release button is activated until the lock bolt is snapped into the release position. At this time, the movement of the lock bolt is transmitted to the rocker by the extension on the lock bolt which in turn acts via the cable on the bolt of the locking device so that the latter is moved against the force of the spring into the release position.

The locking lever, the lock bolt and the active connection between the two locking devices according to the invention are arranged on the back rest part. This design is especially advantageous because the back rest part, together with all of the components belonging to it necessary for the locking and unlocking process, can be assembled in advance and installed as a unit in the motor vehicle. The back rest part can also be installed in the motor vehicle fully assembled.

According to another version not shown in the drawing, the locking lever, the lock bolt and the active connection can be arranged on the vehicle body. This arrangement is well suited for vehicles in which the locking mechanisms for the back rest, for engineering or other reasons, are arranged in the side wall of the vehicle body, and the corresponding locking pins collaborating with the locking mechanism are arranged on the back rest part. In this design, all components necessary for the locking and unlocking process, e.g., the cable or pins for locking the inner hinge, can be laid or installed in the vehicle body in advance. As a result, the back rest part is relieved of weight and more free space is available for the back rest part.

The invention permits numerous variants. For further illustration of its basic principle, some of them are shown in the drawing and described in the following.

DESCRIPTION OF THE PREFERRED EMBODIMENT

Figure 1:
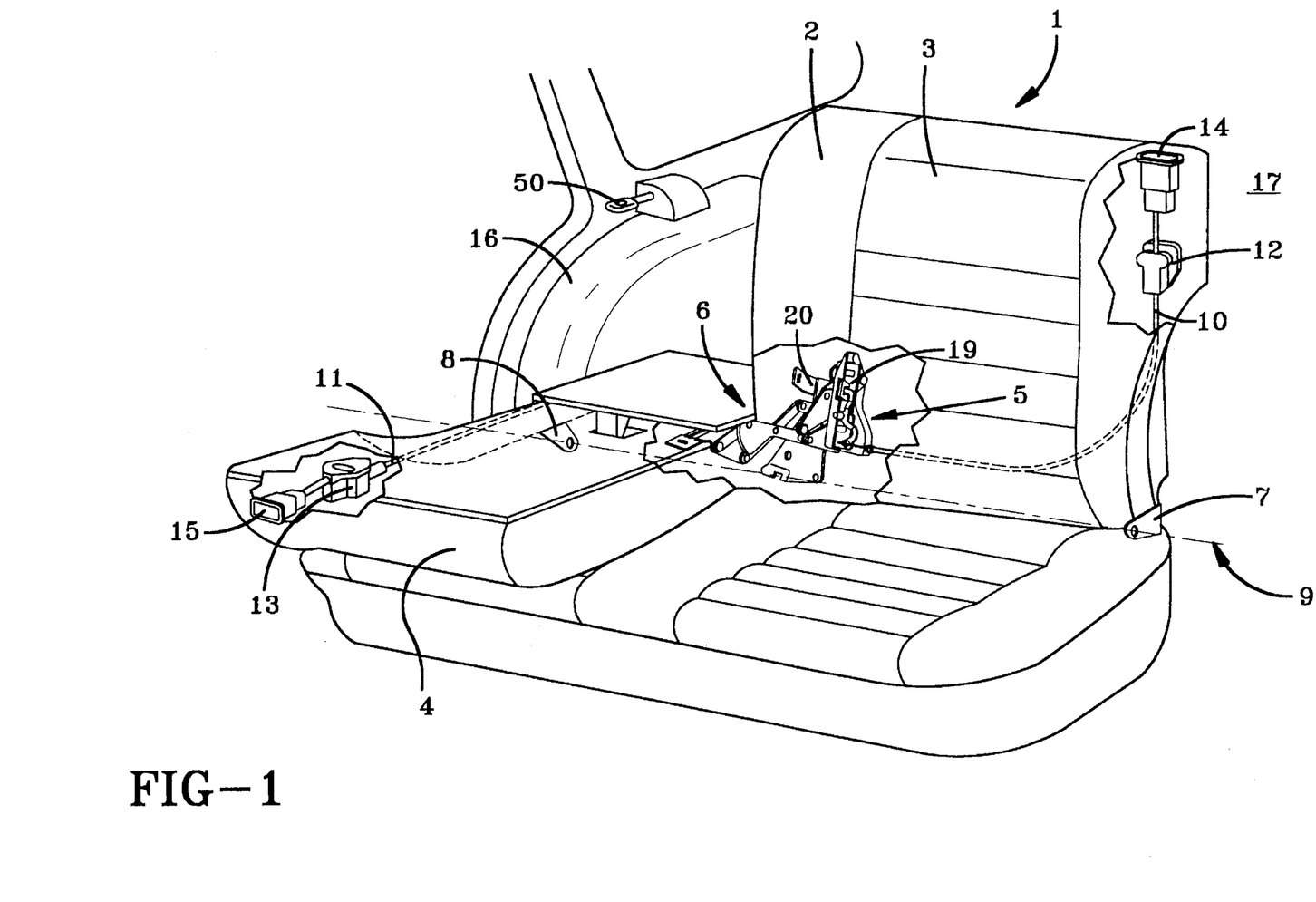
FIG. 1 is a perspective view of a vehicle rear seat arrangement according to the invention with a divided back rest where the back rest is folded forward.

In the vehicle holding rear seat arrangement shown in FIG. 1, the seat back or back rest is divided off center, where the individual parts of the back rest 3 and 4 rotate about a pivot axis when folded. For this purpose, each back rest part 3 and 4 has an outer hinge 7 or 8 in the region of the side walls 16 and 17 and an inner hinge 5 or 6 arranged in the region of the division plane of the back rest. The hinges 5, 6, 7, 8 are designed and arranged on the vehicle body in such a way that the pivot axis 9 is a continuous line running horizontally and transversely to the direction of travel of the vehicle the seat is located in. In FIG. 1, the back rest part 4 is unlocked and folded, and the back rest part 3 is shown locked in approximately the vertical position of use, while the parts integrated in the back rest part 3, 4 or arranged behind the back rest parts 3, 4 are drawn in to illustrate the invention.

To lock the back rest part 3 in the region of the side wall 17 (not shown), a locking device 12 is provided which is connected by a cable 10 to another locking device 19 on the inner hinge 5. As a result, both locking devices 12, 19 can be locked and unlocked jointly. This locking occurs automatically due to the pivoting back of the back rest part 3 into approximately the vertical position of use, and unlocking is accomplished by activation of a release button 14 arranged on the top side of the back rest part 3.

Figure 3:
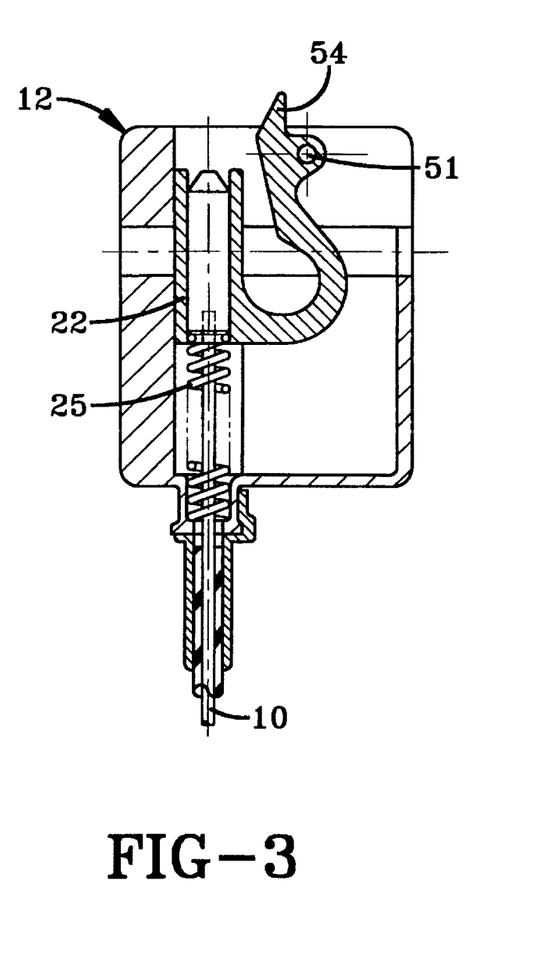
FIG. 3 is a sectional view of the locking device along section line I in FIG. 2.

The back rest part 4 is locked and unlocked in the same manner as for the back rest part 3. In FIG. 3 for illustration of the automatic locking, the locking strap 50 connected firmly to the vehicle body in the region of the side wall 16 is shown, which collaborates with the locking device 13 when the back rest part 4 is pivoted back.

Figure 2:
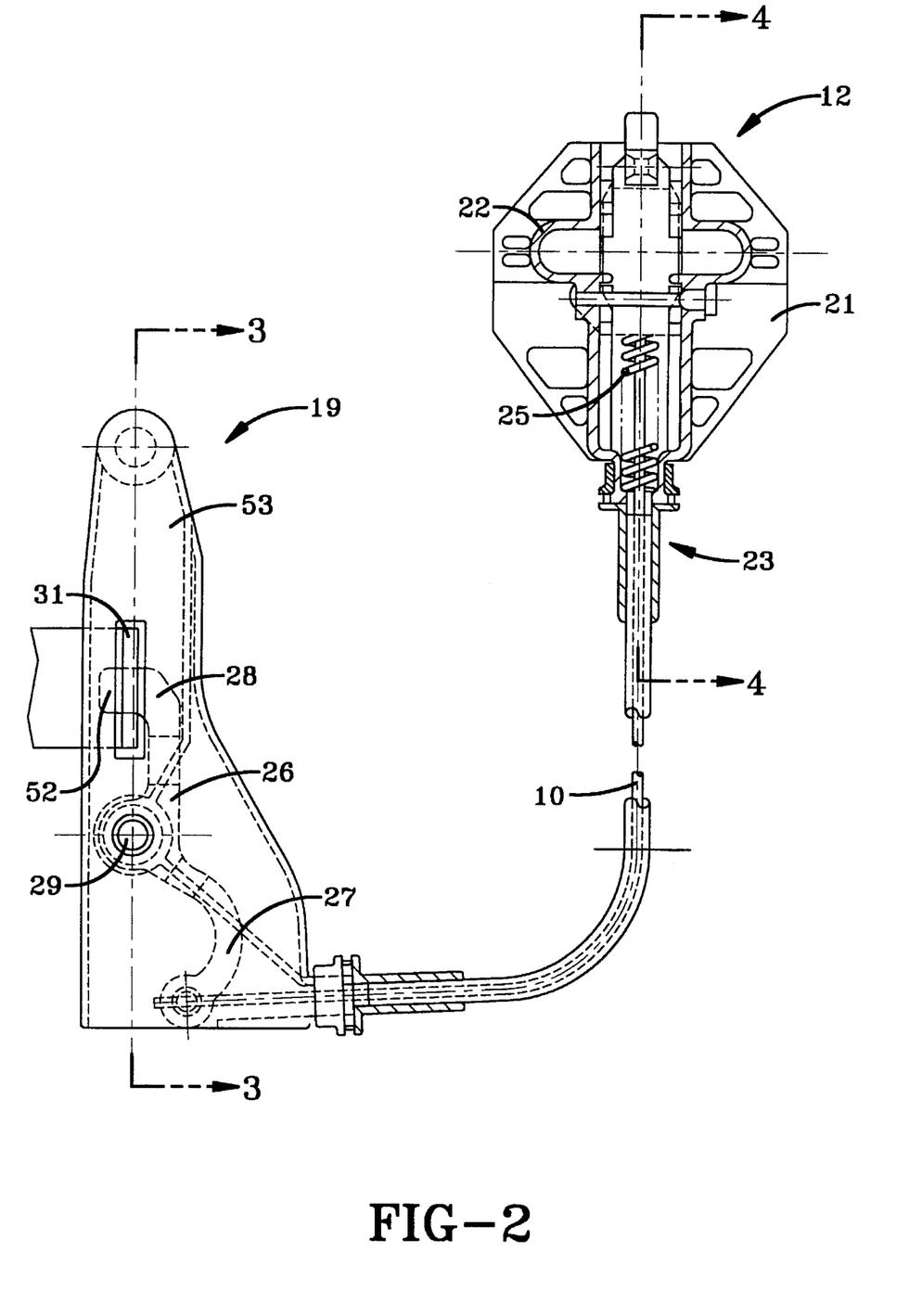
FIG. 2 is a partially schematic view of locking devices which are connected to one another by a cable.

The kinematic relationships in the case of joint activation of the locking devices 12 and 19 or 13 and 20 are shown in FIG. 2. Since the kinematic relationships are the same for the locking devices 12, 19 and 13, 20 of the two back rest parts 3, 4, in the following only the kinematic relationships exemplified by the back rest part 3 shown locked in FIG. 1 will be explained.

As FIG. 2 shows, the locking device 12 engaging the side wall 17 has a locking mechanism 21 in which a lock bolt 22 is guided in a lockable manner, while a spring 25 arranged on the lock mechanism 21 holds the lock bolt 22 under tension in the locking position 2 as shown. As FIG. 3 especially shows, the lock bolt 22 has a spring-loaded latch leg 54 directed toward the top 2 which is provided with a boring 51 to connect with a (not shown) release button 14. The locking device 12, depending on the version of the invention, may be arranged on the back rest part 3 or on the vehicle body.

Figure 4:
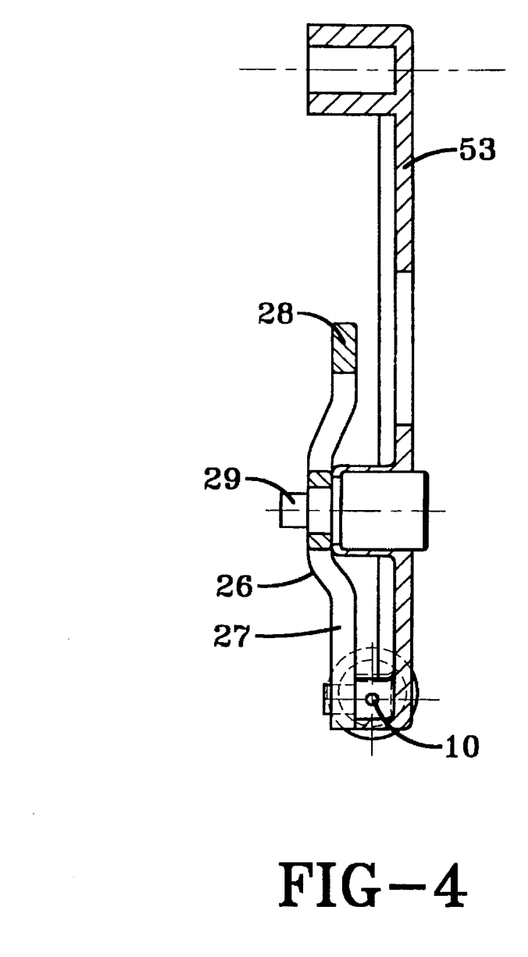
FIG. 4 is a sectional view of the locking device along section line II in FIG. 2.

To connect the two locking devices 12 and 19, a cable 10 is provided. The cable 10 is connected at one end 23 in a releasable manner to the lock bolt 22 and at the other end 24 to the pivot arm 27 of a locking lever 26. The other pivot arm 28 is provided with an angle bend 52 which engages a lug 31 in the locked state. The lug 31 in this case, for better understanding, is indicated by thin broken-dotted lines. The locking lever 26, as illustrated in FIG. 4, is supported by a turning knuckle 29 in a pivoting manner on a holder 53 which, depending on the version of the invention, may be arranged on the back rest part 3 or on the vehicle body.

Figure 5:
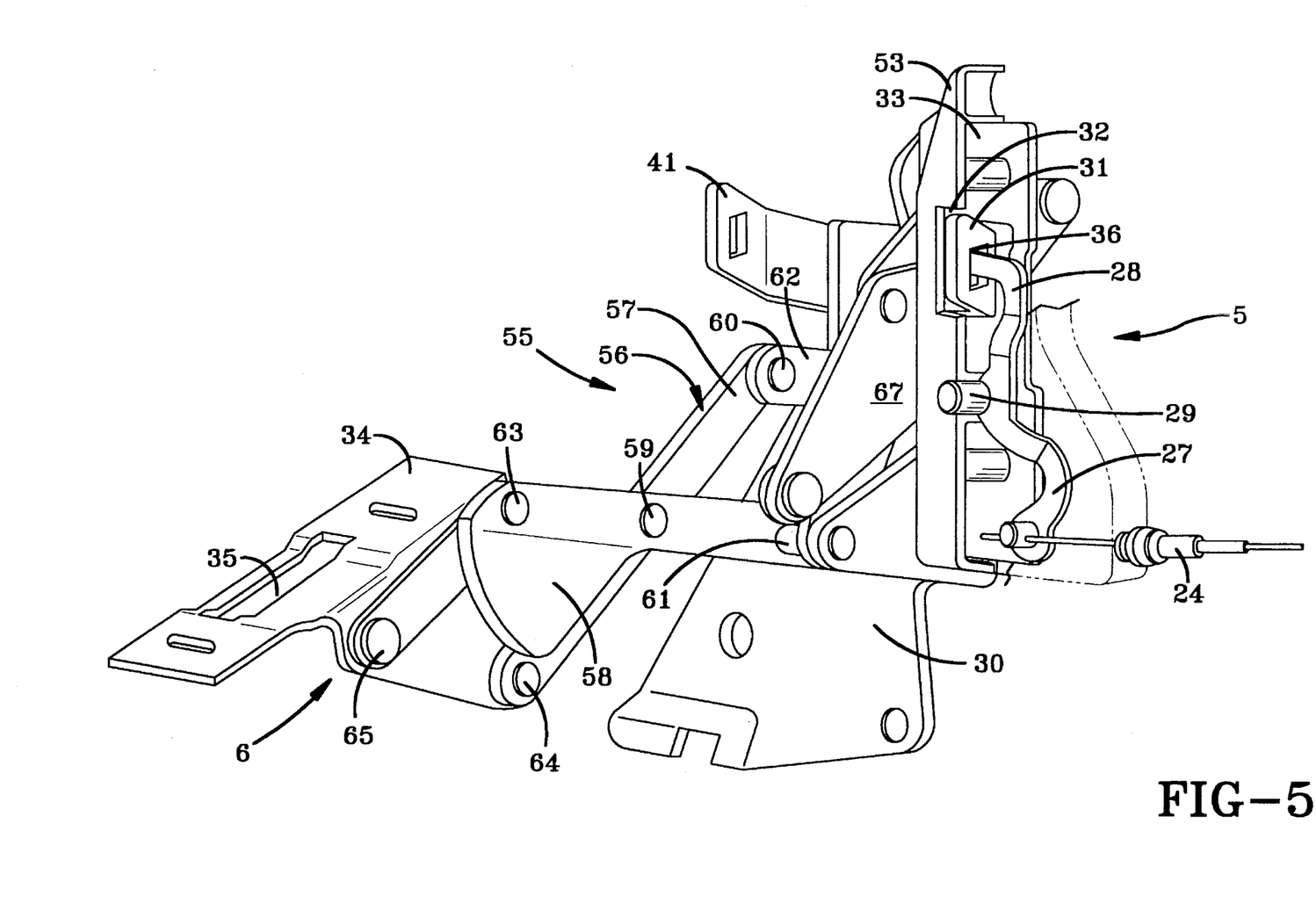
FIG. 5 is a perspective view of the inner hinges according to FIG. 1 where one hinge is in the locked position and the other hinge is shown in a position corresponding to a folded back rest part.

FIG. 5 shows in perspective view the inner hinges 5, 6 according to the invention as shown in FIG. 1 without the surrounding parts, where one hinge 5 is in the locked position and the other hinge 6 is shown in the position corresponding to the folded back rest part 4. Since all individual parts of the inner hinges 5, 6 are designed as mirror images relative to the plane of division of the back rest, in the following only one inner hinge 5 and 6 will be described.

Thus, the inner hinge 6 essentially has a fastening part 30 on the vehicle body side, a fastening part 34 on the back rest side and a removable mechanism 55 where the fastening part 30 on the vehicle body side is designed in such a way that it is simultaneously used as the vehicle body-side fastening part for the inner hinge 5. The removable mechanism 55 connecting the two fastening parts 30, 34 is designed as a scissor-like multi-jointed mechanism, the scissors part 56 consisting of two equal-length lever parts 57, 58 connected to each other by a swivel joint 59.

For the rotatable connection with the vehicle body-side fastening part 30, the scissors part 56 on the side facing the fastening part 30 at both ends of the lever parts 57, 58 in each case has a swivel joint 60, 61. One swivel joint 61 is intended for direct connection to the fastening part and the other swivel joint 60 for connection with one end of a rotating lever 62, the other end of the rotating lever 62 being connected by another swivel joint also to the fastening part 30.

For the rotatable connection with the fastening part 34 on the back rest side, the scissors part 56 on the side facing the fastening part 34 on the back rest side has in each case a swivel joint 63, 64 at both ends of the lever parts 57, 58. One swivel joint 64 is intended for connection to the fastening part 34 on the back rest side and the other swivel joint 63 for connection to one end of an intermediate lever 66, the other end of the intermediate lever 66 also being connected through another swivel joint 65 to the fastening part 34 on the back rest side.

With this design, the unlocked back rest-side fastening part 34 can describe an approximately circular path about the pivot axis 9 when the back rest part 4 is folded.

To lock the inner hinge 6 on the vehicle body-side fastening part 30, a lug 41 is provided which, when the back rest part 4 pivots back into the approximately vertical position of use, passes through an opening 35 on the back rest fastening part 34. As exemplified by the locked hinge 5, one clearly sees that in this position the pivot arm 28 of the locking lever 26 engages an opening 36 provided in the lug 31 and thus locks the inner hinge 5. The locking of the inner hinge 6 is accomplished in the same manner.

As also shown in FIG. 5, the locking lever 26 is mounted with the capability of pivoting on the fastening part 33 on the back rest side by means of the swivel joint 29. The pivot arm 27 of the locking lever 26 in this case is connected in a releasable manner to the end 24 of the cable pull 10. For locking, the pivot arm 27 is activated by the cable pull 10.

For further simplification of the design of the hinges 5, 6 according to the invention, the swivel joints arranged on the fastening part 30 on the vehicle body side are simultaneously designed as swivel joints acting for both removable mechanisms 55, 67. This concerns especially the rotatable mounting of the lever part 58 and the rotating lever 62 on the hinges 5, 6 on the vehicle body side.

Figure 6:
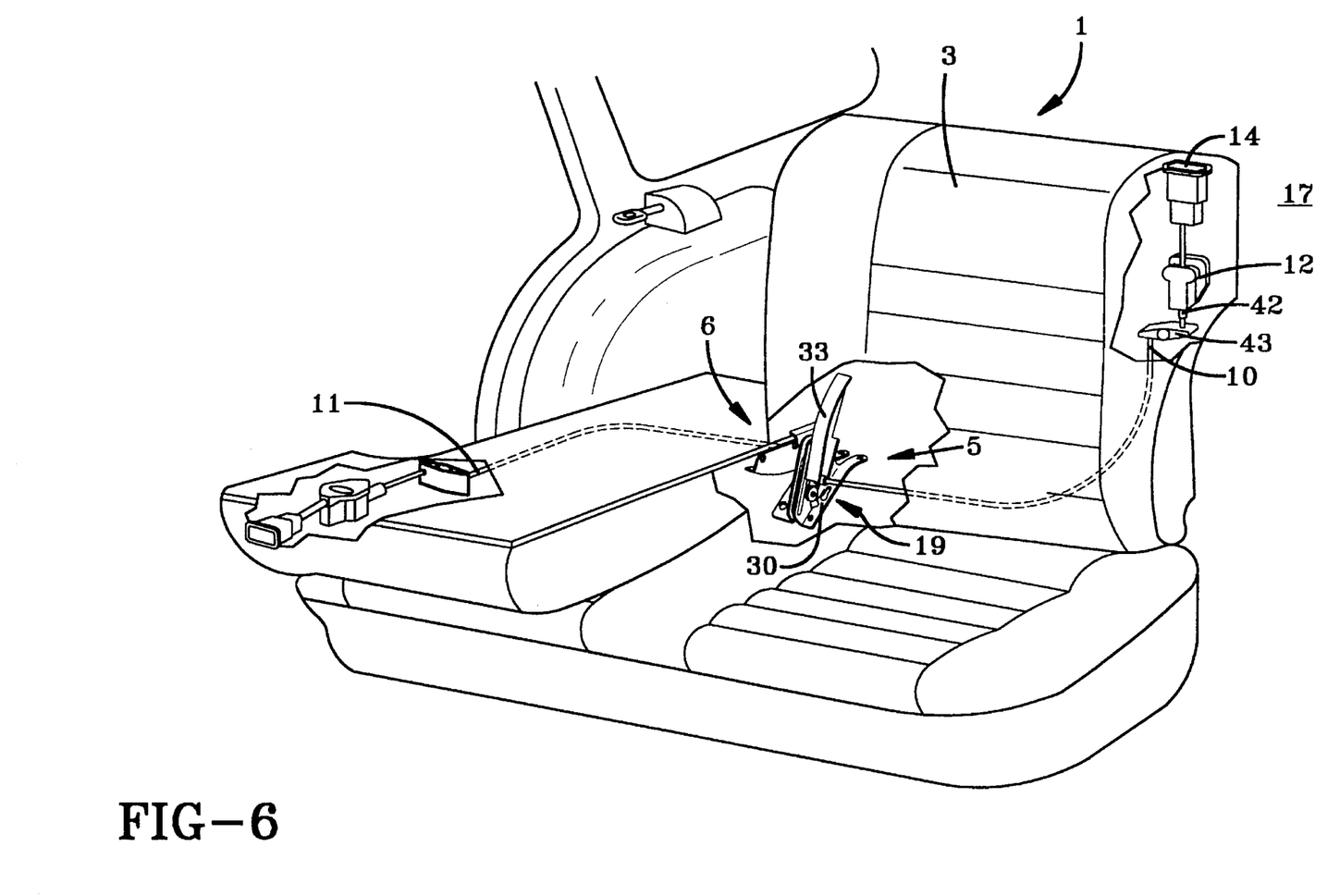
FIG. 6 shows a vehicle rear seat corresponding to FIG. 1 but with an alternative design of the inner hinge and the active connection between the two locking devices.
Figure 7:
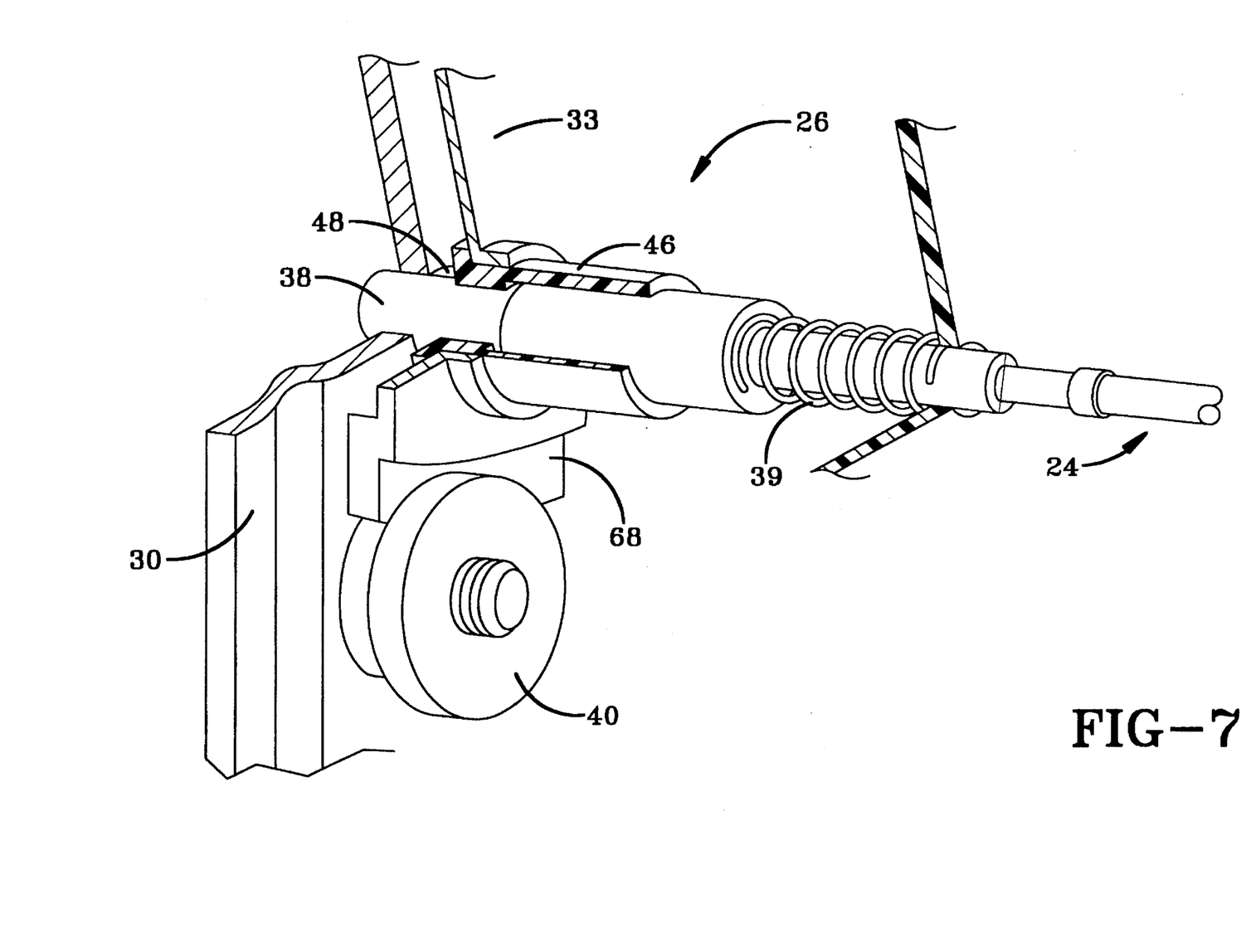
FIG. 7 shows a movable support of a pin on the inner hinge in FIG. 6.

An alternative variant of the invention as shown in FIGS. 6 and 7 envisions that for locking and unlocking the locking devices 19, 20, the locking lever 26 in each case is designed as a pin 38 which is connected at one end with the cable pull 10, 11. Since the locking is the same on both back rest parts 3, 4, in the following only the locking or unlocking of one back rest part 3 will be illustrated.

As FIG. 7 shows, the pin 38 is movably mounted axially by means of a guide bushing 36 on the fastening part 33 on the back rest side. The pin 38 in this case is under tension in the locked position from a spring 39 which is supported on the back rest-side fastening part or on the back rest part 3.

In the locked position as shown, the pin 38 engages a boring 48 on the fastening part 30 on the vehicle body side and thus connects the two fastening parts 30, 33 to one another. In order to better attach the fastening part 33 on the back rest side transversely to the travel direction to the fastening part on the vehicle body side 30, an angle bend 68 is formed on the fastening part 33 on the back rest side which, in the locked position, engages a supporting roll 40 rotatably mounted on the fastening part 30 on the vehicle body side. In this way, the back rest part 3 is additionally supported in the approximately vertical position of use transversely to the travel direction.

The cable 10 is affixed with one end 24 to the pin 38 and with the other end as shown in FIG. 6 to one side 44 of the rocker 45 which is mounted capable of pivoting on the back rest part 3. The other rocker side 43 is in contact with an extension 42 which is connected to the lock bolt 22 of the locking device 12. The rocker 45 in this version is intended to reverse the direction of motion of cable 10 so that locking and unlocking jointly is possible. The force of the spring 39 exerting tension on the pin 38 is transmitted via the cable 10 to the rocker side 44 so that the rocker 45 is also tensioned in the direction of rotation in the counterclockwise direction. In this way when the back rest part 3 is locked and unlocked, a constant contact is assured in the locking device 12 between the rocker side 43 and the extension 42.

Figure 8:
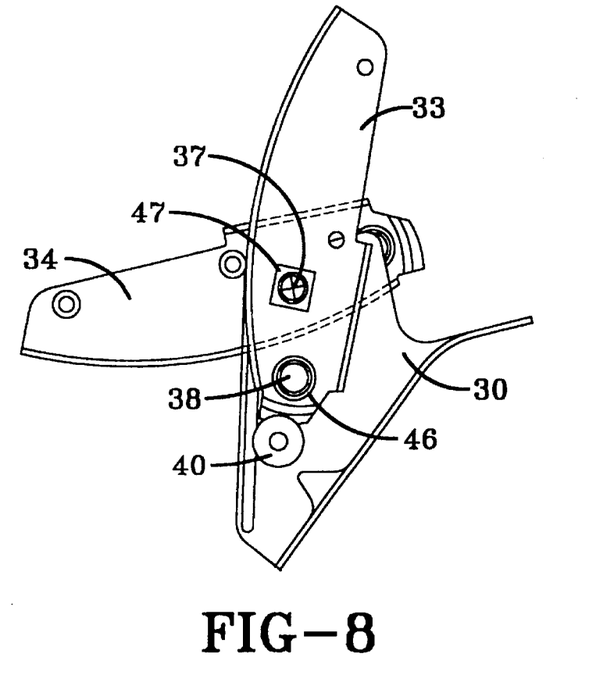
FIG. 8 is a side view of the inner hinge in FIG. 6.
Figure 9:
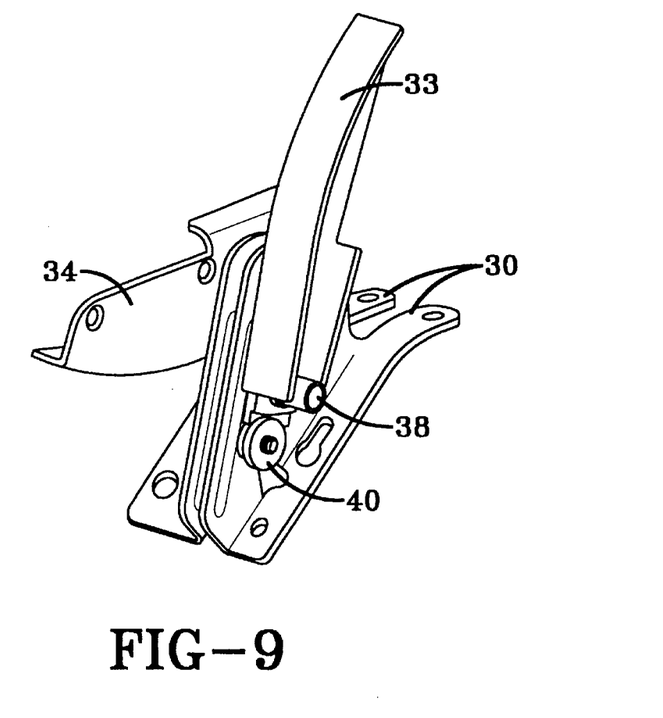
FIG. 9 is a perspective view of the inner hinge in FIG. 8.

FIG. 8 shows a side view of the inner hinges 5, 6 in FIG. 6, and FIG. 9 shows a perspective view of these hinges 5, 6. In FIGS. 8 and 9, the hinges 5, 6 are partially cut away and shown without the surrounding parts. The pivot axis 9 in this case is formed by a threaded bolt 37 which makes the pivoting positioning of the back rest-side fastening part 33 on the fastening part 30 of the vehicle body side possible. For this purpose, a bearing boring for the play-free holding of the threaded bolt 37 and a through-going boring (not shown), as well as a weld nut 47 into which the threaded bolt 37 is screwed, are provided on the fastening part 30 on the vehicle body side and on the fastening part 33 on the back rest side.

Figure 10:
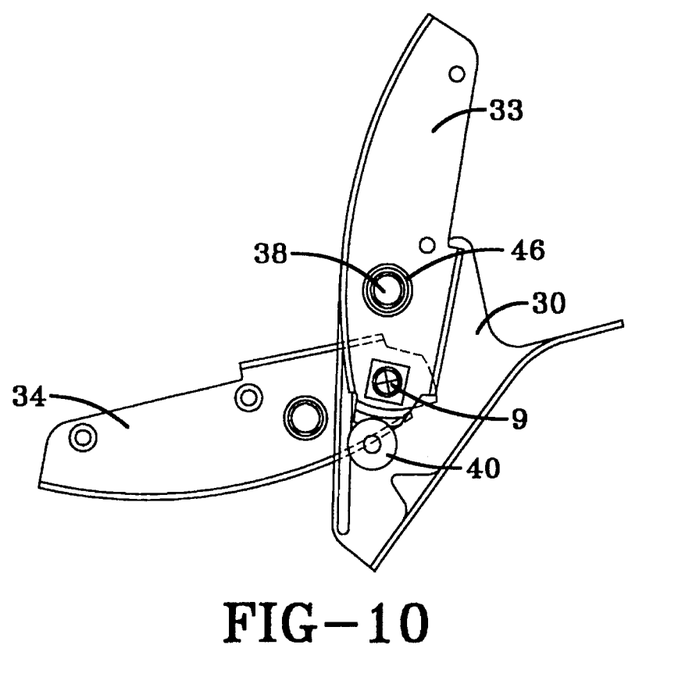
FIG. 10 is a side view of an alternative design of the inner hinge shown in FIG. 6.
Figure 11:
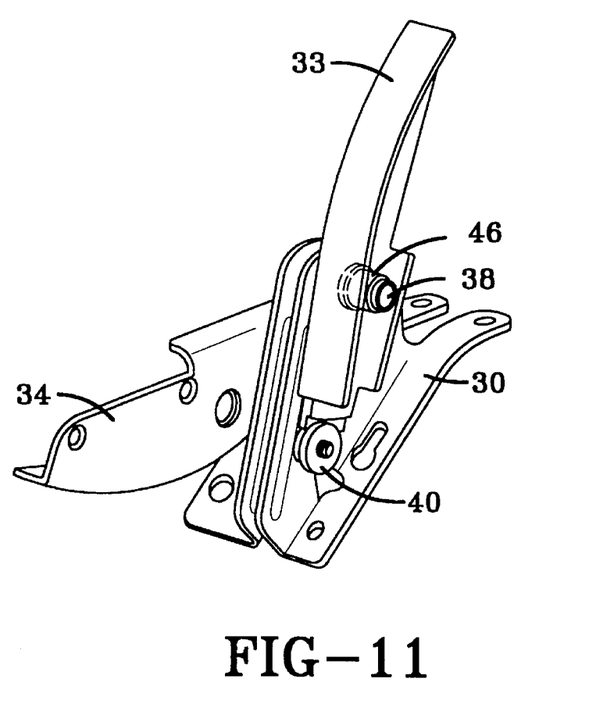
FIG. 11 is a perspective view of the inner hinge in FIG. 10.

An alternative design of the inner hinges 5, 6 is shown in FIGS. 10 and 11. FIG. 10 shows a partially cut away side view and FIG. 11 shows a perspective view of the inner hinges 5, 6 in FIG. 10. This version differs from that shown in FIGS. 8 and 9 only in the arrangement of the pivot axis 9 in the region between the supporting roll 40 and the site where the pin 38 is held which is mounted with the capability of longitudinal displacement in a guide bushing 46 on the fastening part 33 on the back rest side.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An arrangement of a folding rear seat in a body of a motor vehicle, the vehicle body having opposed interior side walls, the rear seat having a back split along a plane region into a first seat back and a second seat back, the first and second seat backs having a first pivotal axis with the vehicle body, the first pivotal axis being horizontal and transverse to a direction of travel of the motor vehicle, the arrangement comprising:

a first locking device for each seat back connected on the seat back to latch with the vehicle body side wall, the first locking device including a lock bolt relatively mounted with the respective seat back for interconnection into a locking strap on the vehicle body side wall; and a second locking device for each seat back including a pivotal lever mounted on the seat back which can pass into a slot in a fastener member fixed to the vehicle body in the split region, the pivotal member preventing the seat back from being pivoted forward from a generally vertical position to a folded horizontal position; and wherein the first and second locking devices are operatively released with a common cable operatively associated with a common release button.

2. A motor vehicle rear seat according to claim 1 characterized in that the cable is sheathed.

3. A motor vehicle rear seat according to claim 1 characterized in that the locking devices can be unlocked jointly by operating a release button arranged on the respective seat back.

4. A motor vehicle rear seat according to claim 1 characterized in that the first and second locking devices are biased automatically to lock by pivoting back the back rest part into the generally vertical seating position.

5. A motor vehicle rear sear according to claim 1 characterized in that the lock bolt is movable into the release position by operating the release button against the force of a spring arranged in the first locking device.

6. A motor vehicle rear seat according to claim 1 characterized in that the pivotal lever is designed as a swivel lever comprising two swivel arms having a turning knuckle arranged between the swivel arms and wherein the cable is attached to one swivel arm and the other swivel arm passes into the slot of the fastener member.

* * * * *